May 23, 1950  E. FARKAS ET AL  2,508,753
METAL FOIL TOOLING MACHINE
Filed Dec. 17, 1945  3 Sheets-Sheet 3

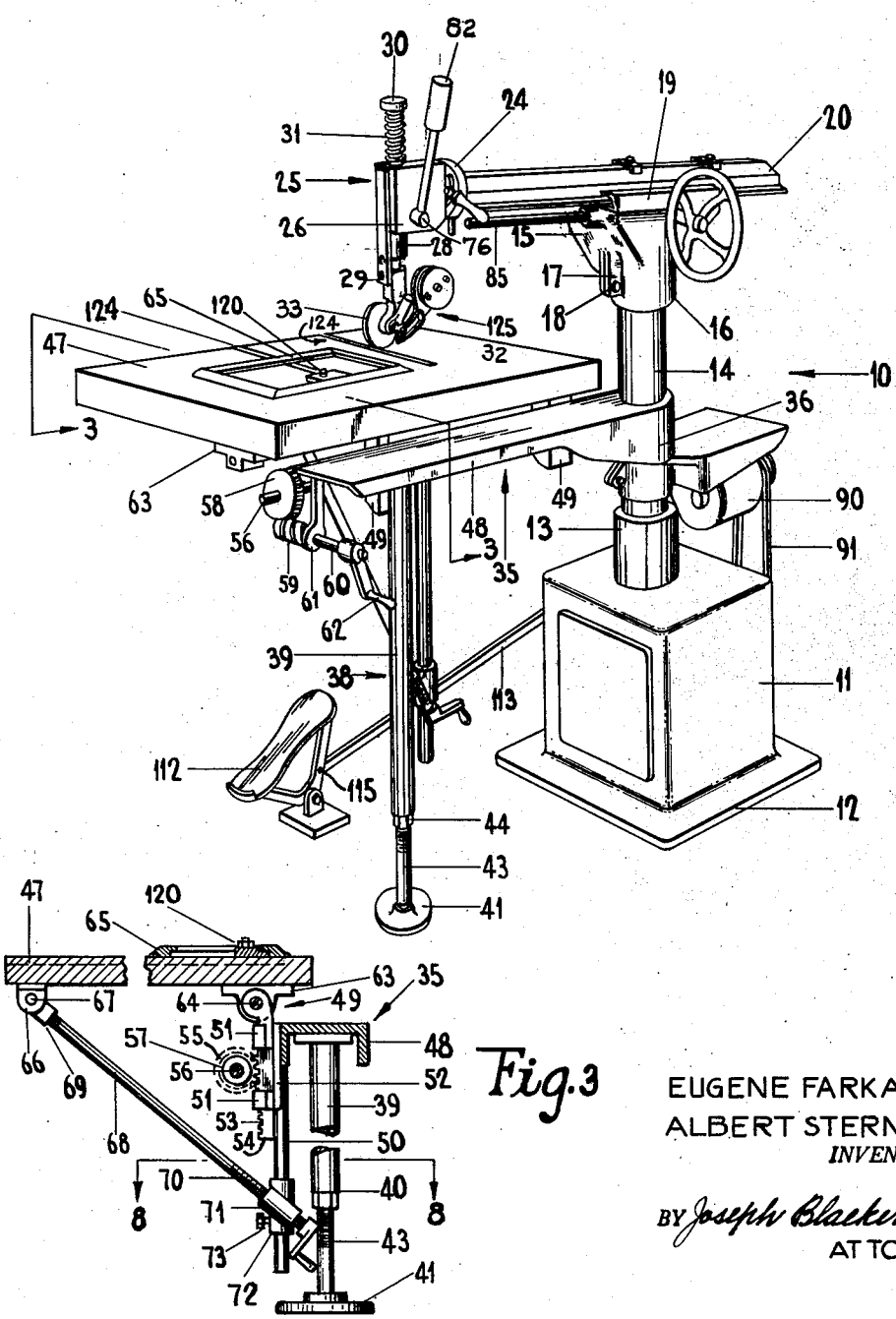

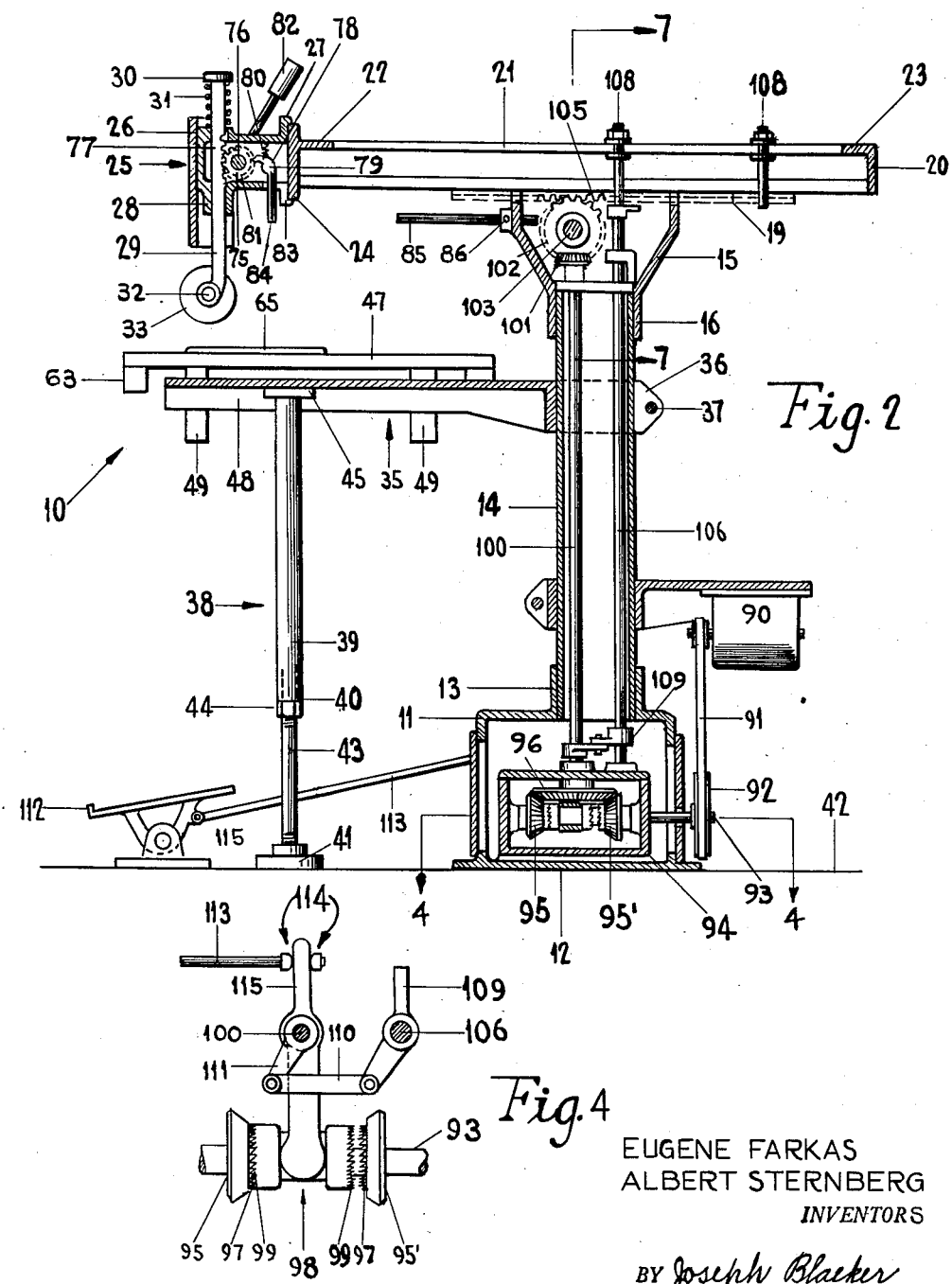

EUGENE FARKAS
ALBERT STERNBERG
INVENTORS

BY *Joseph Blacker*
ATTORNEY

Patented May 23, 1950

2,508,753

UNITED STATES PATENT OFFICE 2,508,753

METAL FOIL TOOLING MACHINE

Eugene Farkas and Albert Sternberg, New York, N. Y., Julia Sternberg executrix of said Albert Sternberg, deceased; said Farkas assignor to Julia Sternberg Application December 17, 1945, Serial No. 635,558

3 Claims. (Cl. 41—7)

1

This invention relates to an embossing machine for applying linear and corner motifs ornamentation to articles such as leather novelties of various shapes, angles, forms, and sizes.

Particularly to emboss articles of beveled and flat shape by power instead of by hand-tooling and the application of metallic and colored leaves of different widths of narrow and wider ribbon-like forms applied in a heated condition.

An object of this invention is to provide a machine having a table for supporting an article to be embossed and comprising a ram mounted for reciprocation relative to the table, the free end of the ram having an embossing wheel mounted for vertically sliding motion and having a pressure arm for bringing the wheel into adjustable pressure contact with an article to be embossed.

Another object of this invention is to provide a head pivotally mounted at the free end of the ram and on which the tooling or embossing wheel is tiltably mounted for the production of linear ornamentations on beveled surfaces.

Another object of this invention is to provide mechanism which enables the machine to be set to different sizes of objects, to start and stop exactly at different lengths of ornamentations, and to set the ram or head and the operating table at any angle desired.

Another object of this invention is to provide means for locking the tooling wheel after it is brought down by the operator so as to assure the application of uniform pressure on the work.

Another object of this invention is to provide an electric heating element vertically movable with the tooling wheel to provide heat to the tooling wheel.

Another object of this invention is to provide means for adjusting the length of the stroke of the ram to suit the length of the article to be embossed.

Another object of this invention is to provide an adjustable gauge on the operating table to hold the article to be embossed.

With the above and other objects in view, the invention will be hereinafter more particularly described, and the combination and arrangement of parts will be shown in the accompanying drawings and pointed out in the claims which form part of this specification.

2

Reference will now be had to the drawings, wherein like numerals of reference designate corresponding parts throughout the several views, in which:

Figure 1 is a perspective view of the embossing or tooling machine.

Figure 2 is a central, longitudinal cross-sectional view of the machine shown in Figure 1.

Figure 3 is a cross-sectional view of a pivotally mounted operating table, the section being taken through an article clamped on the table and in position to have metal foil applied thereto.

Figure 4 is a top plan view of a fragmentary portion of clutch-operating mechanism, the section being taken as on line 4—4 in Figure 2.

Figure 7:
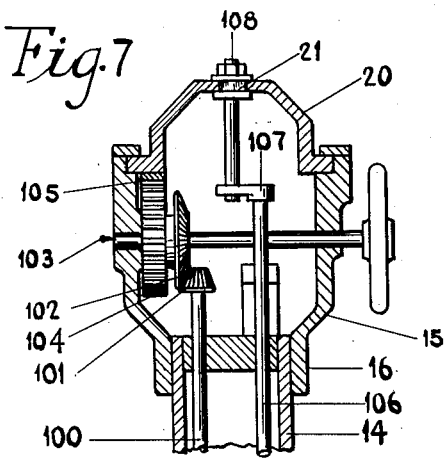
Figure 7 is a cross-sectional view, the section being taken as on line 7—7 in Figure 2.

In the illustrated embodiment of the invention the numeral 10 indicates a metal foil tooling machine for producing ornamental designs in linear or strip form. The machine comprises a housing 11, having a base 12 upon which the machine is suported on a floor. The housing 11 has an upright tubular extension 13, which serves to receive and support a post 14 fixed in upright position.

At the upper end of the post 14 is a frame 15. The frame has a tubular portion 16 which is in engagement with the post 14. The tubular portion 16 has flanges 17 which are slightly spaced apart from each other. The flanges are clamped together by a bolt 18 and serve to maintain the frame 15 in fixed relation on the post 14.

At the upper portion of the frame 15 is a horizontally positioned ram guide 19. A hollow ram 20 is slidably mounted in the guide 19. As best shown in Figure 2, the top wall of the ram 20 has a slot 21 lengthwise thereof, the slot extending substantially the entire length of the upper wall of the ram and being terminated by solid end portions 22, 23.

Secured to the front or head portion 24 of the ram 20 is a tooling device 25, for applying sized gold leaf and other decorative leaf. The tooling device 25 comprises a body 26 having a flange 27 by means of which the body is secured to the head 24 by bolts, etc. (not shown).

The body 26 has a vertically positioned tubular guideway 28. Mounted in the tubular guideway 28 is a spindle 29 having a collar 30 at its upper end. An open coil spring 31 is mounted between the upper surface of the body 26 and the lower surface of the collar 30 and serves to normally maintain the spindle 29 raised relative to the body 26.

Rotatably mounted on a pivot 32 at the lower end 125 of the spindle 29 is a stamping die wheel 33. The stamping wheel 33 has, in practice, a patterned ornamental design formed upon its periphery. This design is adapted to cause the transfer of gold leaf or other similar material from a ribbon of sized leaf material upon an article operated on. The design may be ornamental or it may consist of lettering, or of various desired patterns.

Slidably mounted on the post 14 is an elongated carrier 35, having a split collar 36 by means of which the carrier may be clamped on the post 14 by a bolt 37 passing through the collar 36. At the free end of the carrier 35 is a supporting member 38 for maintaining the carrier in rigid horizontal position. The supporting member 38 comprises a flanged pipe 39 having a threaded lower end 40. A threaded flange 41 rests on the floor 42, on which the entire machine is supported. A threaded rod 43 is threaded into the flange 41 at its lower end and in the pipe 39 at its upper end.

A nut 44 on the rod 43 serves for securing the rod 43 and the pipe 39 in vertically adjusted relation, so that a flange 45 at the upper end of the pipe 39 is in contacting relation with the lower surface of the carrier 35, whereby the carrier is rigidly maintained in horizontal position and adapted for supporting an operating table 47.

The carrier 35 has a channel-shaped cross-section and is positioned with the flanges 48 in upright position. The operating table 47 is mounted on hinges 49 fixed to one of the channel flanges to permit its being pivoted and tilted to an angular position. This pivotal mounting permits ornamenting the edges of openings in beveled articles which may have an inclination of forty-five degrees with the outer face of the frame.

As best shown in Figure 3, an upright rod 50 is fixed to one of the flanges 48 of the carrier 35. Bearings 51 are secured to bars 52 which are fixed to the flange 48. Hinge elements 53 are slidably mounted in the bearings 51. Each hinge element 53 has teeth 54.

A gear 55 is fixedly mounted on a shaft 56, which is rotatably mounted in suitable bearings 57. The teeth of the gear 55 are in meshed engagement with the teeth 54 of the hinge element 53. A worm gear 58 is fixed to the outer end of the shaft 56. A worm 59 is fixed on a shaft 60 which is rotatably mounted in bearings 61. A handle 62 is fixed to the shaft 60.

By operating the handle 62, the shaft 56 may be rotated and the hinge element 53 raised or lowered in relation to the carrier 35.

A bearing 63 is fixed to the lower surface of the table 47. The bearing 63 is pivotally mounted on a pin 64 secured in the upper portion of the hinge element 53. It is thus possible to tilt the table into angular relation with the wheel 33. This arrangement permits embossing articles with beveled surfaces.

Fixed to the lower surface of the table 47 is a bracket 66 carrying a pin 67. An elongated screw 68 has its upper end secured in a threaded receiving member 69 which is pivotally mounted on the pin 67. The lower portion of the screw 68 has a thread 70 in engagement with a nut 71. At the lower end of the rod 50 is a collar 72 having a bolt 73 threaded therein. The bolt 73 serves to secure the collar 72 to the rod 50.

We provide a ratchet wheel 75 mounted on a shaft 76 in the body 26. The ratchet wheel 75 is in meshed engagement with a rack gear 77 on the spindle 29. A pawl 78 mounted on a pivot 79 and down-pressed by a spring 80 is in engagement with the teeth 81 of the ratchet wheel 75 and prevents motion of the ratchet wheel in a clockwise direction.

A pressure-arm 82 is suitably fixed to the shaft 76. The operator may rotate the pressure arm to lower the spindle 29 and bring the wheel 33 into pressure engagement with an article such as a frame 65 to be embossed.

The lower wall of the body 26 has an opening 83 through which passes an extension 84 of the pawl 78. This extension projects below the flange 27. A horizontal rod 85 is fixed in the frame 15 by a bolt 86 and may be adjusted so that its free end will come into contact with the pawl extension 84 and actuate the pawl and release the ratchet wheel 75 and the pressure-arm 82 and permit the spring 31 to raise the wheel 33 out of engagement with the article being embossed.

The means for reciprocating the ram 20 comprise a motor 90, supported on the upright post 14. The motor drives a belt 91 in engagement with a pulley 92 mounted on a shaft 93 in the housing 11. Inwardly of the housing 11 is a housing 94. Two bevel gears 95, 95' are freely rotatably mounted on the shaft 93 and are in meshed engagement with an upper bevel gear 96.

As best shown in Figure 4, the bevel gears 95, 95' have ratchet teeth 97. Slidably mounted on the shaft 93 between the ratchet teeth faces of the bevel gears 95, 95' is a clutch element 98, having ratchet teeth 99, 99 on opposite faces. The ratchet teeth on the clutch element 98 are engageable respectively with the ratchet teeth 97 on the bevel gears 95, 95'. It will be seen that the clutch element 98 may be moved to the right or to the left into engagement with either of the bevel gears 95 or 95'.

A vertical shaft 100 extends from the bevel gear 96 to the upper portion of the frame 15. The vertical shaft 100 carries a bevel gear 101 in engagement with a bevel gear 102 on a shaft 103. The shaft 103 is horizontally mounted at the upper portion of the frame 15. Mounted on the shaft 103 is a gear 104 in meshed engagement with the teeth of the rack gear 105 at the lower face of the slidable ram 20.

The arrangement is such that when the clutch element 98 is engaged with the right-hand bevel gear 95' on the shaft 93, the ram 20 will be moved towards the front of the machine and when the clutch element 98 is in engagement with the left-hand bevel gear 95 the ram will be moved to the rear of the machine.

For the purpose of predetermining the length of stroke of the ram and the resulting length of the embossing, we have provided a vertical shaft 106, having a crank arm 107 which is designed to come into engagement selectively with two adjustable bolts 108, 108, at the upper portion of the ram. It is further to be noted that at the lower portion of the lower vertical shaft 106 there is a fixed lever 109 connected by a link 110 to a lever 111 which is fixed to the shaft 100. A connecting rod 113 carries a fork 114 which is in engagement with an end extension 115 of the lever 111. The other end of the connecting rod 113 is pivotally secured to a foot pedal 112 at a point 115. It is thus possible for the operator to actuate the foot pedal 112 towards the front or towards the rear of the machine so that when the ram 20 is at the end of its stroke, the operator can, by actuating the foot pedal 112 cause the ram 20 to move forward or backward as desired, for the purpose of embossing various articles.

In operation, the article to be ornamented is held on the table 47 by a suitable clamp 120. The embossing wheel 33 at the forward end of the ram 20 is moved over the article 65.

The table 47 is held in a fixed position by the screw 68, the tooling device 25 being vertically adjusted for proper application of the metal foil.

Figure 5:
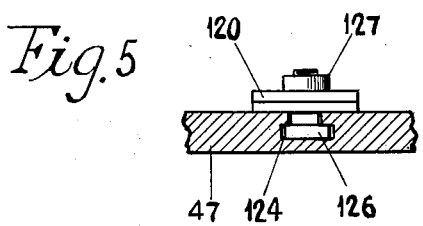
Figure 5 is a view of a fragmentary portion of the operating table, showing a T-shaped slot and a clamp slidably mounted therein.

As best shown in Figure 1, the table 47 has two T-shaped slots 124 extending outwardly at one end of the table. Figure 5 is a view of a fragmentary portion of the operating table 47, showing one of the T-shaped slots 124. A T-shaped bolt 126 is slidably mounted in the slot. The bolt 126 carries a threaded nut 127 at its upper end which serves to fasten the clamp 120 at any desired position along one of the slots 124.

Figure 6:
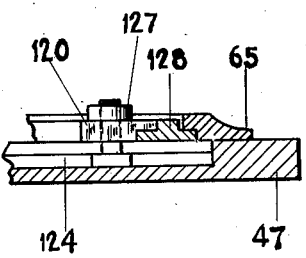
Figure 6 is a view of a fragmentary portion of the operating table, showing an adapter clamped in position for supporting an article to be embossed.

Figure 6 is a view of a fragmentary portion of the operating table showing the clamp 120 mounted in operating position in one of the slots 124. An adapter 128 is secured to the upper face of the table by the clamp 120. The adapter is preferably made of wood, having a degree of resiliency. An article to be embossed, such as that shown at 65 is mounted on the adapter. The adapter serves to absorb any undue pressure caused by the tooling device 25 on the article being embossed.

Figure 8:
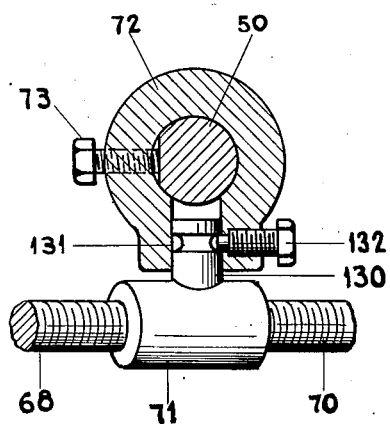
Figure 8 is a view of a fragmentary portion of pivoting means for tilting the operating table.

Figure 8 shows an enlarged fragmentary portion of pivoting means for tilting the operating table 47, the view being partly in cross-section, the section being taken on line 8—8 in Figure 3. The collar 72 on the vertical rod 50 is partly broken away to show a pivot pin 130 which is integral with the threaded nut 71. The pivot pin 130 has a circular groove 131 at its free end portion. The pivot pin 130 is freely rotatably mounted in a cylindrical opening in collar 72. A locking screw 132 is threadably mounted in the collar 72 and has its free end seating in the groove 131. The arrangements thus described permits the screw 68 to assume different angular positions in relation to the vertical rod 50 when the operating table 47 is adjusted to desired angular positions.

Figure 9:
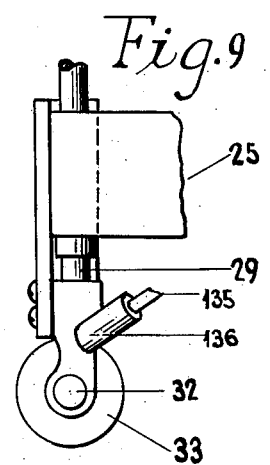
Figure 9 is an enlarged view of a fragmentary portion of the mounting for the heated tooling device.

Figure 9 is an enlarged view of a fragmentary portion of the mounting for the heated tooling device, comprising electrical conducting wires 135 suitably connected to an electrical heating element 136 which is well known in the art.

It is to be noted that the supply container for a ribbon of metal leaf and means for heating the leaf fed to the rotatably supported stamping wheel 33, may be in the form disclosed in U. S. Patent No. 2,192,717 or in the U. S. Patent No. 2,366,293.

In accordance with the patent statutes we have described and illustrated the preferred embodiment of our invention, but it will be understood that various changes and modifications can be made therein without departing from the spirit of the invention as defined by the appended claims.

We claim:

1. In a tooling machine for producing elongated linear metal foil ornamentations, the combination with a base having an upright post, a ram mounted on said post, a horizontal table adjustably mounted on said post below said ram, said table having means for fixedly supporting an article to be embossed, said ram being reciprocable in a horizontal plane in spaced-apart relation from and above said table, a tooling device secured to the free end of said ram and supporting a spindle for up and down motion relative to said table, an electrically heated tooling wheel rotatably supported on said spindle and being mounted for vertical slidable motion with said spindle, a pressure arm resiliently supported on said tooling device for bringing said wheel into adjustable pressure contact with said article, resiliently actuated ratchet gear means mounted in said tooling device for locking said pressure arm in said vertically adjusted relation, means for automatically unlocking said pressure arm after said tooling operation, a forwardly or rearwardly movable foot pedal and foot actuated reversible clutch means controlling horizontal reciprocation of said ram and wheel, said foot pedal being movable forwardly to cause said tooling wheel to move into operative position, and rearwardly to cause said tooling wheel to move into inoperative position.

2. In a tooling machine for producing elongated linear metal foil ornamentations, the combination with a base having an upright post, a ram mounted on said post, a horizontal table adjustably mounted on said post below said ram, said table having means for fixedly supporting an article to be embossed, said ram being reciprocable in a horizontal plane in spaced-apart relation from and above said table, a tooling device secured to the free end of said ram and supporting a spindle for up and down motion relative to said table, an electrically heated tooling wheel rotatably supported on said spindle and being mounted for vertical slidable motion with said spindle, a pressure arm resiliently supported on said tooling device for bringing said wheel into adjustable pressure contact with said article, resiliently actuated ratchet gear means mounted in said tooling device for locking said pressure arm in said vertically adjusted relation, a stop member adjustably mounted on said post and engageable with said ratchet gear for automatically unlocking said pressure arm after said tooling operation, a forwardly or rearwardly movable foot pedal and foot actuated reversible clutch means controlling horizontal reciprocation of said ram and wheel said foot pedal being movable forwardly to cause said tooling wheel to move into operative position, and rearwardly to cause said tooling wheel to move into inoperative position.

3. In a tooling machine of the class described for producing elongated linear metal foil ornamentations, the combination with a table having an article to be embossed, a ram and tooling wheel movable to and from said article, a forwardly or rearwardly movable foot pedal, and foot actuated reversible clutch means controlling horizontal reciprocations of said ram and wheel, said foot pedal being movable forwardly to cause said tooling wheel to move into operative position, and rearwardly to cause said tooling wheel to move into inoperative position.

EUGENE FARKAS.
ALBERT STERNBERG.

REFERENCES CITED

The following references are of record in the file of this patent:

UNITED STATES PATENTS

| Number | Name | Date |
|---|---|---|
| 798,014 | Coe | Aug. 22, 1905 |
| 799,535 | Coe | Sept. 12, 1905 |
| 1,239,149 | Weymouth | Sept. 4, 1917 |
| 1,708,795 | Kaufmann | Apr. 9, 1929 |
| 1,910,918 | Hehn | May 23, 1933 |

FOREIGN PATENTS

| Number | Country | Date |
|---|---|---|
| 586 | Great Britain | Jan. 1, 1901 |